United States Patent [19]
Van Leemput

[11] 3,824,051
[45] July 16, 1974

[54] MOLD APPARATUS FOR ISOSTATIC PRESSING OF HOLLOW PARTS

[75] Inventor: Hendrick Jozef Van Leemput, Duffel, Belgium

[73] Assignee: National Forge Company, Irvine, Pa.

[22] Filed: June 25, 1973

[21] Appl. No.: 372,904

[52] U.S. Cl............ 425/78, 249/65, 249/145, 425/405 H, 425/412, 425/468, 425/DIG. 44
[51] Int. Cl....... B29c 5/00, B30b 5/02, B30b 11/32
[58] Field of Search .. 425/78, 405 H, 468, DIG. 43, 425/DIG. 44, DIG. 19, 412; 249/65, 145

[56] References Cited
UNITED STATES PATENTS

| | | | |
|---|---|---|---|
| 3,064,309 | 11/1962 | Steinbock et al. | 425/DIG. 44 |
| 3,172,153 | 3/1965 | Loomin et al. | 425/405 H X |
| 3,263,275 | 8/1965 | McElroy | 425/DIG. 43 |
| 3,408,432 | 10/1968 | Tumm et al. | 425/405 H X |
| 3,414,951 | 12/1968 | Schulse | 425/405 H X |
| 3,500,513 | 3/1970 | Stanley | 425/DIG. 19 |
| 3,550,198 | 12/1970 | Roberts | 425/405 H X |
| 3,632,243 | 1/1972 | Neott | 425/468 X |

*Primary Examiner*—J. Howard Flint, Jr.
*Attorney, Agent, or Firm*—Ronald F. Ball

[57] ABSTRACT

In manufacturing hollow parts by the application of isostatic pressure to powder particles a resiliently supported mandrel is used to permit relative movement between the mandrel and the support during the application of the isostatic pressure. The mandrel is removably received in the supporting structure to permit disengagement of the mandrel from the supporting structure following the application of isostatic pressure. The resilient mounting of the mandrel and its ability to be removed from the supporting structure permits the production of hollow compacted parts that are free from cracks.

5 Claims, 7 Drawing Figures

PATENTED JUL 16 1974  3,824,051
SHEET 1 OF 2
FIG.1.
FIG.2.
FIG.3.
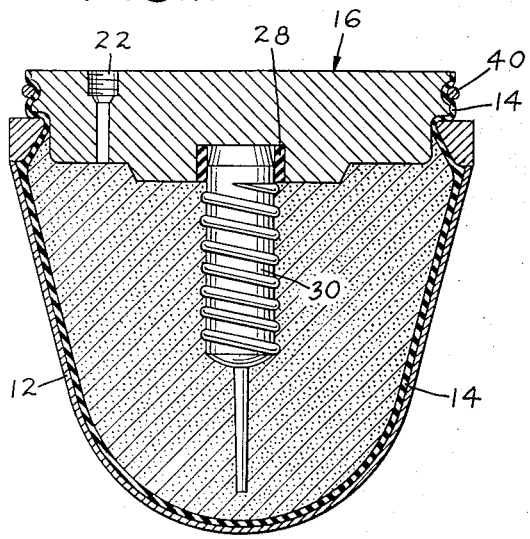
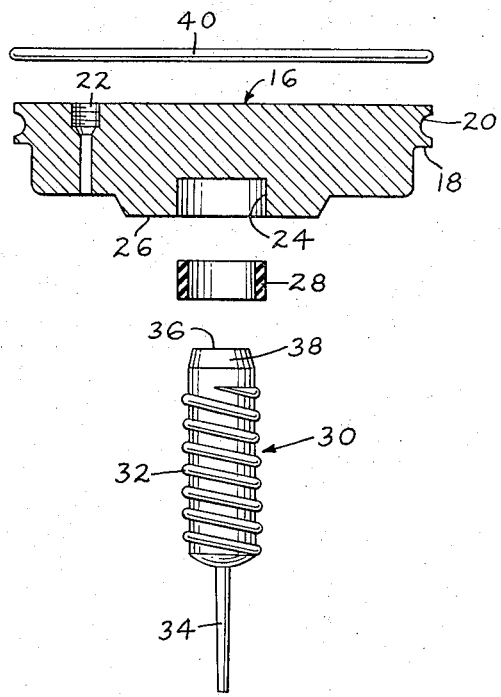
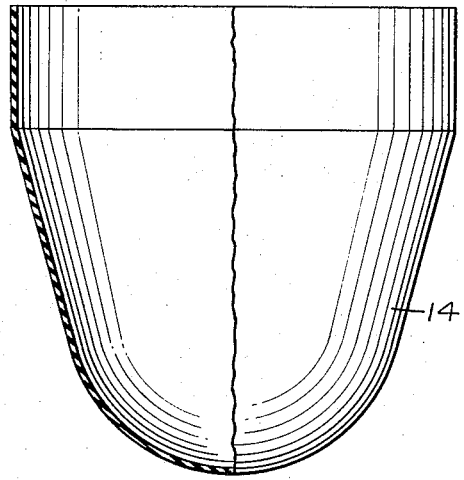
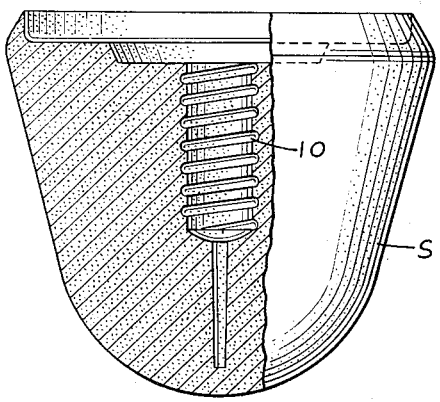
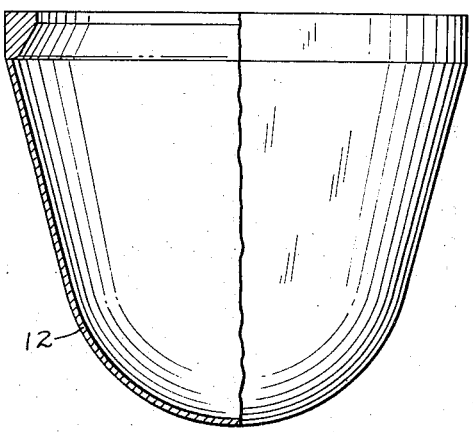

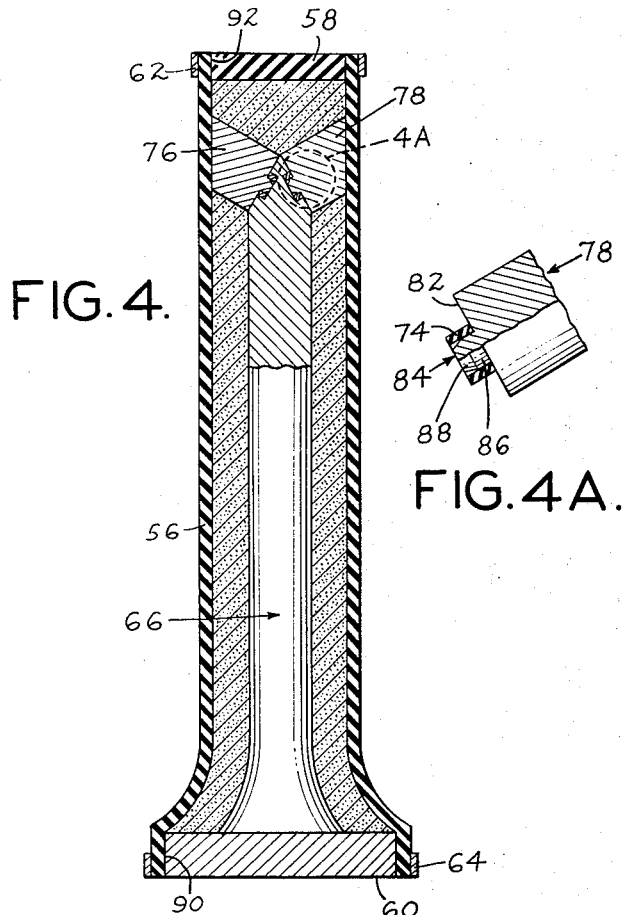
FIG. 4.
FIG. 4A.
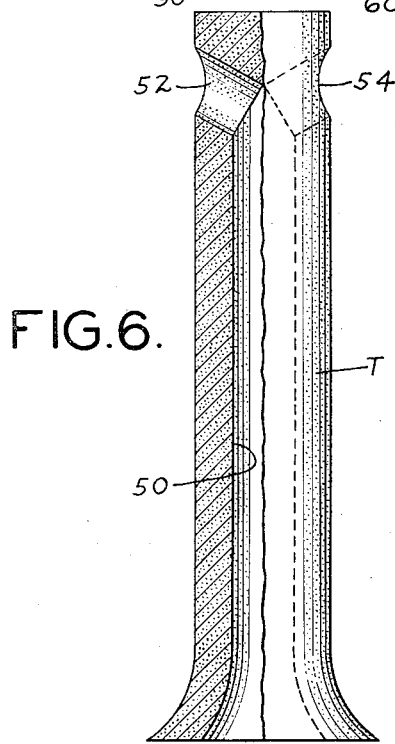
FIG. 6.
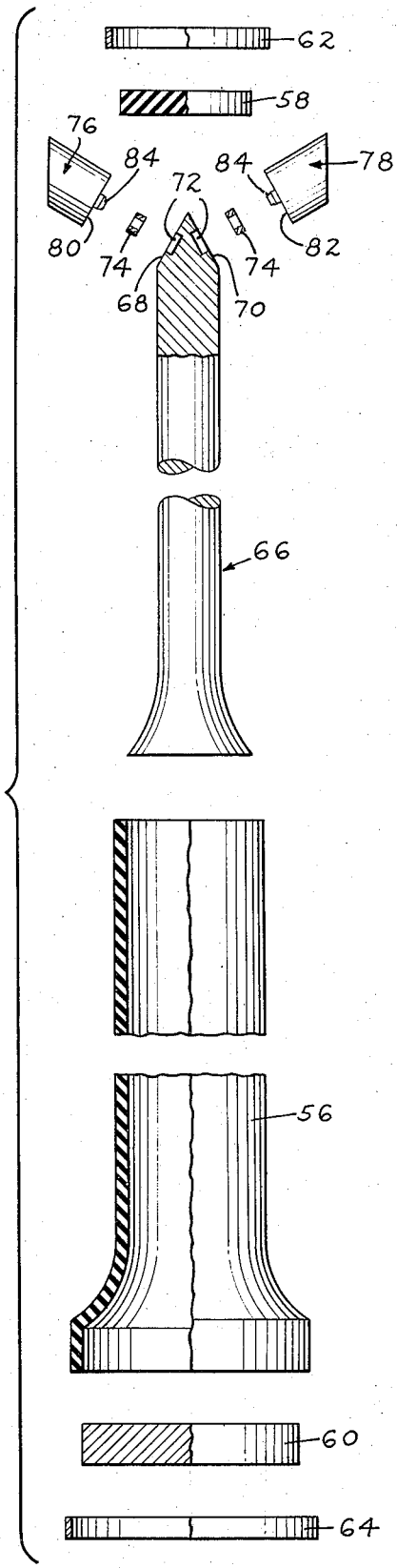
FIG. 5.

MOLD APPARATUS FOR ISOSTATIC PRESSING OF HOLLOW PARTS

BACKGROUND OF THE INVENTION

The present invention relates to apparatus for the production of hollow parts by the application of isostatic pressure to a mold containing powder particles.

In the casting of metal parts it is known to use deformable cores or inserts that will accommodate strains due to shrinkage as the molten metal cools. See, for example, U.S. Pat. No. 663,548 to Ludlow. In addition, it is known to use composite metal and flexible patterns in the manufacture of molds having a back draft. See, for example, U.S. Pat. 3,624,758 to Harris. However, neither of these techniques is suitable to overcome the problem I have experienced in making hollow parts by compacting powdered materials.

For example, when producing a hollow part from powder by subjecting a flexible container holding the powder to isostatic pressure, I have found that it is difficult to remove the core or mandrel required in forming the part after compaction. One possible cause of this is the deformation or movement of the mandrel during pressurization of the powder. If the flexible mold into which a mandrel is inserted is not evenly filled with powder, the density of the powder in one section of the mold may be different from that in another. As isostatic pressure is applied the mandrel is subjected to pressure differentials, which, if of sufficient magnitude, will cause the mandrel to deform slightly during the isostatic pressing operation. On depressurization, and assuming the deformation of the mandrel has not exceeded its elastic limit, the mandrel will want to return to its original position, i.e., that occupied prior to the application of the isostatic pressure. However, because the powder material has been compacted, it will resist movement and the mandrel will be held in the compacted part under tension. This will result either in resistance to removal of the mandrel when an attempt is made to withdraw it from the formed part, or in the creation of cracks and imperfections in the compacted part.

SUMMARY OF THE INVENTION

The present invention relates to apparatus for the production of hollow parts by compacting powder particles using isostatic pressure. The invention comprises a mandrel that is resiliently and removably connected to a mold cover or other supporting part of a tooling set used in producing the part. The resilient connection may be in the form of a rubber or other elastomeric ring that is positioned between the mandrel and the supporting member.

It is an object of the invention to produce compacted parts having one or more cavities therein, i.e., "hollow" parts, that are readily separated from the mandrels or cores used to form the cavity.

It is a further object of the invention to produce hollow compacted parts that are free from cracks or fractures that may be caused by movement of the mandrel or core during the compacting process.

It is another object of the invention to produce hollow parts by compacting powder particles with isostatic pressure and to be able to withdraw the mandrel or core used to form the part without cracking or otherwise damaging the part during removal of the mandrel.

It is still another object of my invention to provide a tooling set for use in the production of hollow parts from powder that is of simple structure and easily assembled.

A more complete understanding of my invention may be gained from the following description and from the annexed drawings, in which:

BRIEF DESCRIPTION OF THE DRAWINGS

FIG. 1 is a cross-sectional view of a powder filled mold incorporating a resiliently mounted mandrel in accordance with my invention for making a compacted part by the application of isostatic pressure.

FIG. 2 is an exploded view, partly in section, of the parts of the mold and resiliently mounted mandrel shown in FIG. 1.

FIG. 3 is a view partly in section of the compacted part made using the apparatus of FIGS. 1 and 2.

FIG. 4 is a cross-sectional view of another powder filled mold and mandrel parts resiliently mounted in a central mandrel for making a hollow compacted part having several cavities therein by the application of isostatic pressure.

FIG. 4A is an enlarged detail of the dotted encircled portion 4A of FIG. 4.

FIG. 5 is an exploded view, partly in section, of the parts of the mold and mandrels shown in FIG. 4.

FIG. 6 is a view, partly in section, of the compacted part made using the apparatus of FIGS. 4 and 5.

DESCRIPTION OF THE PREFERRED EMBODIMENTS

A compacted part in the form of a ladle stopper S made using the apparatus of the present invention is shown in partial cross-section in FIG. 3. This stopper is made from powder particles that have been subjected, in a mold or canister, to the application of isostatic pressure. The stopper has a threaded cavity 10 axially disposed therein. In use a metal rod (not shown) with a threaded end is screwed into the cavity 10 in order that the stopper may be manipulated to plug the hole of a ladle containing, for example, molten metal. It will be understood that the stopper S is not a part of my invention, but simply a typical and illustrative hollow part of the type that may be formed using the resiliently mounted mandrel of my invention.

Referring to FIGS. 1 and 2, canister 12, made from a relatively thin but rigid metal, surrounds and supports a rubber mold 14. A steel plate of circular cross section, generally designated 16, having a radially extending flange portion 18 and a circumferential recess 20 therein, serves as a cover for the canister 12. Plate 16 also has a tapped evacuation port 22, the use of which will be more fully described hereinafter. A cylindrically shaped hole 24 is drilled part way into the cover from the bottom surface 26 thereof.

An annular, resilient rubber rings 28 or collar having an outside diameter slightly larger than the diameter of hole 24 is compressively fitted within hole 24. A steel mandrel, generally designated 30, has threads 32 and a spear or stem portion 34 at its lower end. The opposite or upper end 36 of mandrel 30 has a slight taper 38 which forms a frusto-conical section. I have found that a taper of approximately 5° is satisfactory.

As shown in FIG. 1, the frusto-conical section on the upper end of mandrel 30 is approximately one-half the depth of hole 24. The diameter of the mandrel at the outer end of the taper 38 is less than the inside diameter of the collar 28 when the latter has been inserted into the hole 24. The diameter of the mandrel immediately below the taper is approximately the same as the inside diameter of the collar 28. This construction assures easy entry of the upper end of the mandrel into the assembled collar 28 and cover 16 as well as a snug fit of the mandrel within the collar when the mandrel has been inserted to the full depth of hole 24. It also permits removal of the cover plate from the mold after completion of the isostatic pressing operation, as more fully described hereinafter.

In assembling the parts shown in FIGS. 1 and 2, the rubber mold 14 is placed within carrier 12. The mandrel 30 is inserted into the mold with its upper end extending above the level to which the mold will be filled. Conventional means, not shown, may be used to center the mandrel within the mold. The mold is filled with powder of the desired composition. The canister may be vibrated during or after the filling operation or the powder may be tamped into the canister. Cover plate 16, with the rubber collar 28 positioned in hole 24, is then placed over the upper end of the mandrel as shown in FIG. 1.

The cover is also placed within the upper portion of the rubber mold 14. A clamping ring 40 holds the upper portion of the mold 14 within recess of the cover 16.

Following assembly, a vacuum pump, not shown, is connected by means of an appropriate conduit, not shown, to evacuation port 22 to evacuate any air entrapped within the mold. The port 22 is then sealed in a manner well known in the art. The filled canister is then subjected to isostatic pressure to compact the powder.

During the compacted process any variation in the density of the powder within the mold, due, for example, to inadvertent uneven filling of the mold, will result in an uneven distribution of pressure on the mandrel 30. This pressure differential, if of sufficient magnitude, will cause the mandrel to move within the mold during the application of isostatic pressure. However, on depressurization any tendency of the mandrel to return to its original position, i.e., its position before pressure was applied, will be absorbed by the resilient collar 28 in the cover plate 16.

On completion of the pressure cycle, clamping ring 40 is released and the cover 16 removed, leaving mandrel 30 within the compacted part. The collar 28 normally will be removed with the cover. The mandrel is then unscrewed from the compacted part and the rubber mold 14 and canister 12 stripped from the compacted part.

FIGS. 4-6 illustrate another embodiment of my invention. FIG. 6 shows a compacted hollow part T in the form of refractory teeming nozzle having a central axially disposed cavity 50 connected to two inclined, radially disposed cavities 52 and 54. The part T is made by isostatically pressing powder particles in the mold and associated tooling shown in FIGS. 4 and 5.

Rubber mold 56 is fitted with top and bottom closures 58 and 60, respectively, held in place by sealing rings 62 and 64, respectively. A generally cylindrical central mandrel 66 is axially disposed within the mold 56. As best shown in FIG. 5, the upper end of mandrel 66 is machined to present opposed flat surfaces 68 and 70. Each of the surfaces 68 and 70 has a cylindrical hole 72 drilled therein with the sides of the hole being normal to the plane of the surfaces 68 and 70. Each of the holes 72 is fitted with an annular resilient rubber ring or collar 74 having an outside diameter slightly larger than the diameter of hole 72.

Side mandrels 76 and 78 are provided with end faces 80 and 82, respectively. As clearly shown in FIG. 4A, centrally disposed on each of the end faces is a stud 84 with substantially cylindrical section 86 and a frusto-conical section 88. The diameter of the cylindrical section is the same as the inside diameter of rubber ring 74. The taper of frusto-conical section 88 is approximately 5°. The outer end of the frusto-conical section 88 has a diameter slightly less than the inside diameter of collar 74 when collar 74 is fitted within hole 72 for easy insertion of the stud therein. When assembled the end faces 80 and 82 abut the opposed flat surfaces 68 and 70, respectively, of the central mandrel 66. Rubber collar 74 is held snugly within hole 72, and stud 84 extends into and is also held snugly within the cavity by collar 74.

To use the mold shown in FIGS. 4 and 5 the central and side mandrels are preassembled by inserting rubber collars 74 into holes 72 followed by the insertion of the studs 84 of side mandrels 76 and 78 into the collars so that the end surfaces 80 and 82 are in contact with flat surfaces 68 and 70, respectively. The central mandrel is centrally mounted on bottom closure 60 by suitable means, not shown, and the assembly is inserted into the rubber mold 56. As shown in FIGS. 4 and 5, mold 56 is self-supporting. However, it should be understood that mold 56 may, if desired, be surrounded by a supporting canister made of thin flexible metal in a manner well known in the isostatic pressure art.

Following insertion of the assembled mandrel into the mold with bottom closure 60 inserted into cylindrically shaped opening 90 of the mold, sealing ring 64 is applied. Powder particles are then poured into mold 56 through opening 92 at the top thereof. During the filling operation the assembled mold, mandrel and bottom closure member may be mounted on a vibrating table to assure substantially even packing of the powder as the mold is filled. Other means may be utilized to achieve substantially even packing.

When the mold is completely filled, top closure member 58, which may be of rubber, is inserted within the mold, as shown in FIG. 4, and sealing ring 62 is applied.

The assembled and filled mold is then subjected to isostatic pressure. Any variation in the density of the powder within the mold will result in the application of differential pressures to the mandrel. If the pressure differentials are of sufficient magnitude, either the central mandrel, either or both of the side mandrels, or all of the mandrels will move during the application of isostatic pressure. After compaction of the part and depressurization, any tendency of the mandrels to return to their original prestressed position will be absorbed by the rubber collars 74.

Following depressurization, sealing ring 64 is removed and the compacted part, together with the imbedded mandrel assembly, is removed from the mold. The side mandrels are then separately removed from the central mandrel and the central mandrel is withdrawn from the compacted part. The resilient connection of the side mandrels to the central mandrel results in the production of a hollow, isostatically pressed part that is substantially free from cracks and from which the forming mandrels may be readily removed.

The powder particles used in manufacturing hollow parts as described herein may be of any suitable material, i.e., metal, metallic oxides, metallic carbides, refractory powders, ceramics, cermets, etc.

The isostatic pressing can be performed under any desired condition, e.g., at room temperature or elevated temperature, provided only that the characteristics of the resilient means mounting the mandrel to its supporting member are not adversely affected.

While the invention has been described in connection with specific embodiments thereof and for specific uses, various modifications thereof will occur to those skilled in the art without departing from the spirit and scope of the invention as set forth in the appended claims.

What is claimed is:

1. Apparatus for the production of hollow parts by the application of isostatic pressure to a mold containing powder particles comprising:
   a flexible mold,
   a mandrel within said mold,
   a support within said mold for said mandrel,
   resilient means connecting said mandrel to said support to permit relative movement therebetween during the application of said isostatic pressure,
   said mandrel being removably received in said support to permit disengagement therefrom following the application of said isostatic pressure said support means comprises a closure for said mold, said closure being secured to said mold by a clamping ring.

2. The apparatus of claim 1 wherein said closure is provided with means to evacuate said mold prior to the application of isostatic pressure thereto.

3. Apparatus for the production of hollow parts by the application of isostatic pressure to a mold containing powder particles comprising:
   a flexible mold,
   a mandrel within said mold,
   a support within said mold for said mandrel,
   resilient means connecting said mandrel to said support to permit relative movement therebetween during the application of said isostatic pressure,
   said mandrel being removably received in said support to permit disengagement therefrom following the application of said isostatic pressure, said support means comprises a second mandrel.

4. Apparatus for the production of hollow parts by the application of isostatic pressure to a mold containing powder particles comprising:
   a flexible mold,
   a mandrel within said mold,
   a closure,
   a clamping ring securing said closure to said mold,
   said closure supporting said mandrel within said mold,
   a rubber collar intermediate said mandrel and said closure, said collar permitting relative movement therebetween during the application of said isostatic pressure to said mold,
   said mandrel being removably received in said closure to permit disengagement therefrom following the application of said isostatic pressure.

5. Apparatus for the production of hollow parts by the application of isostatic pressure to a mold containing powder particles comprising:
   a flexible mold,
   a first mandrel within said mold,
   a second mandrel within said mold,
   said second mandrel being supported within said mold by said first mandrel,
   resilient means being interposed between said first and second mandrels to permit relative movement therebetween during the application of said isostatic pressure,
   said first and second mandrels being removably connected to permit disengagement following the application of said isostatic pressure.

* * * * *